(12) United States Patent
Kojima

(10) Patent No.: US 8,006,965 B2
(45) Date of Patent: Aug. 30, 2011

(54) VIBRATION ISOLATOR

(75) Inventor: Hiroshi Kojima, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 864 days.

(21) Appl. No.: 11/997,885

(22) PCT Filed: Jul. 25, 2006

(86) PCT No.: PCT/JP2006/314678
§ 371 (c)(1),
(2), (4) Date: Feb. 4, 2008

(87) PCT Pub. No.: WO2007/015395
PCT Pub. Date: Feb. 8, 2007

(65) Prior Publication Data
US 2010/0219570 A1    Sep. 2, 2010

(30) Foreign Application Priority Data
Aug. 4, 2005  (JP) .................. 2005-226559

(51) Int. Cl.
*F16F 5/00*    (2006.01)
(52) U.S. Cl. ............ 267/140.13; 267/140.11; 267/141.2
(58) Field of Classification Search ............. 267/140.13, 267/140.11, 140.14, 140.15, 141.1, 141.2, 267/141.4, 141.6
See application file for complete search history.

(56) References Cited

U.S. PATENT DOCUMENTS

| 6,505,822 B1 * | 1/2003 | Yamamoto et al. ...... 267/140.13 |
| 7,052,003 B2 * | 5/2006 | Ueki ........................ 267/140.13 |
| 2002/0158388 A1 * | 10/2002 | Itoh et al. .................. 267/140.11 |
| 2008/0315472 A1 * | 12/2008 | Kadowaki et al. ........ 267/140.11 |

FOREIGN PATENT DOCUMENTS

| JP | 2004-360710 A | 12/2004 |
| JP | 2005-023974 A | 1/2005 |
| JP | 2005-113978 A | 4/2005 |

OTHER PUBLICATIONS

International Search Report dated Oct. 17, 2006.
European Search Report dated Mar. 17, 2011.

* cited by examiner

Primary Examiner — Pam Rodriguez
(74) Attorney, Agent, or Firm — Sughrue Mion, PLLC

(57) ABSTRACT

A vibration isolator having an inner passage of a communication tube that communicates the negative pressure chamber with the valve chamber. A pipe connection part and a supply/discharge pipe communicate the valve chamber with the supply/discharge port of a switching valve on the outside of the vibration isolator. The switching valve selectively communicates the supply/discharge port to either an intake manifold as the negative pressure supply source, or an atmosphere space. The negative pressure chamber communicates with the valve chamber through the communication tube on the inner peripheral side of the outer cylinder member. Thus, either of a negative pressure and an atmospheric pressure, which is same as a pressure in the valve chamber, can be supplied into the negative pressure chamber, by supplying either of the negative pressure and the atmospheric pressure into the valve chamber through the supply/discharge pipe and the pipe connection part.

8 Claims, 3 Drawing Sheets

US 8,006,965 B2

VIBRATION ISOLATOR

TECHNICAL FIELD

The present invention relates to a vibration isolator, which is applied to automobiles, general industrial machineries and the like, for isolating and absorbing vibration transmitted from a vibration source, such as an engine, to a vibration reception portion, such as a vehicle body.

BACKGROUND ART

In automobiles, vibration isolators are arranged between an engine and a vehicle body (or frame). One example of vibration isolator applied as an engine mount is disclosed in Patent Document 1: Japanese Patent Application Laid-open Publication No. 2005-23974, which is in the form of a liquid-type isolator. The vibration isolator disclosed in Patent Document 1 includes a liquid space liquid-tightly sealed from outside by an outer cylinder, an elastic body formed of rubber, and a diaphragm. The liquid space is divided by a partition member into a main liquid chamber with the elastic member forming part of its walls, and an auxiliary liquid chamber with the diaphragm forming part of its walls. The main liquid chamber and the auxiliary liquid chamber are communicated with each other by two orifices, i.e., a shaking orifice and an idling orifice, having respective flow resistance for the liquid, which are different from each other.

In the vibration isolator disclosed in Patent Document 1, furthermore, the partition member is provided with a movable rubber plate that is faced to the mail liquid chamber, and also with a first operating air chamber (negative pressure chamber) that is situated on the outer side of the main liquid chamber with the movable rubber plate therebetween. The first operating air chamber is connected, through an air supply/discharge passage and a first air pipeline both extending through the partition member and the housing (outer cylinder member), with a switching valve for effecting changeover between a negative pressure and an atmospheric pressure. The known vibration isolator further includes a valve mechanism arranged between the bottom wall portion of the outer cylinder member and the diaphragm, for opening or closing a shaking orifice formed in the partition member. The valve mechanism is provided with a second operating air chamber (valve chamber) having partition walls, which is partly formed by a rubber pressure member (movable wall), and a coil spring for urging the pressure member in a predetermined closure direction. The second operating air chamber is connected to the switching valve through a connection port and a second air pipeline both extending through the bottom wall of the outer cylinder member. In this instance, when the pressure member is moved to a closed position under the biasing force of the coil spring, the shaking orifice is closed by a valve member that is formed at the center portion of the diaphragm. On the other hand, when the second operating air chamber is supplied with a negative pressure and the pressure member is moved to its open position against the biasing force of the coil spring, the valve member is moved from the partition member together with the pressure member to open the shaking orifice.

DISCLOSURE OF THE INVENTION

Task to be Solved by the Invention

In the vibration isolator according to Patent Document 1, the first operating air chamber and the second operating air chamber are each connected to the switching valve for selectively supplying one of the negative pressure and atmospheric pressure. It is thus necessary to independently provide two internal passage systems (i.e., the air supply/discharge passage and the connection port) so as to extend between the first and second operating air chambers to outside of the outer cylinder member, and also to connect the first and second air pipelines with the two internal passage systems at their distal ends, and with the air supply/discharge port in the switching valve at their proximal ends, through a branch valve.

Therefore, in the vibration isolator according to Patent Document 1, due to the requirement for the provision of two independent internal passage systems within the vibration isolator and for the provision of two air pipelines on the outside of the vibration isolator, for connecting the two internal passage systems, respectively, to the operating pressure supply sources, not only the number of components of the vibration isolator increases, but also the assembly of the vibration isolator to vehicles or the like is much troublesome in that the two air pipelines must be connected to the two internal passage systems while preserving sealing function at the connections.

Taking the above-mentioned fact into consideration, it is an object of the present invention to provide an improved vibration isolator that allows simplification of the pipeline structure for connecting the operating pressure supply source to the negative pressure chamber with the membrane as a partition wall, and also to the valve chamber of the valve mechanism for opening or closing the second restricted passage, and simplification of the connection work for connecting the negative pressure chamber and the valve chamber to the operating pressure supply source.

Means for Solving the Task

To solve the above-mentioned task, a first aspect of the present invention resides in a vibration isolator, which comprises: an outer cylinder member connected to one of a vibration source and a vibration reception portion; a mount member arranged on an inner peripheral side of the outer cylinder member and connected to the other of the vibration source and the vibration reception portion; an elastic body arranged between the outer cylinder member and the mount member; a main liquid chamber filled with a liquid and having partition walls, a part of which is formed partly by the elastic body so that the main liquid chamber has an inner volume that changes as the elastic body deforms; an auxiliary liquid chamber filled with a liquid and having partition walls, a part of which is formed partly by a diaphragm so that the auxiliary liquid chamber is expandable/contractible; a first restriction passage for communicating the main liquid chamber and the auxiliary liquid chamber with each other; a second restriction passage for communicating the main liquid chamber and the auxiliary liquid chamber with each other, the second restriction passage being different in flow resistance from the first restriction passage; a film-like membrane forming another part of the partition walls of the main liquid chamber, and being elastically deformable in an expanding/contracting direction for increasing/decreasing the inner volume of the main liquid chamber; a negative pressure chamber provided on an outer side of the main liquid chamber through the membrane, for attracting the membrane to an inner wall when supplied with a negative pressure, to thereby restrain the membrane from deformation in the expanding/contracting direction, and releasing the membrane from the inner wall when supplied with an atmospheric pressure; a valve mechanism including a valve body supported movably between an open position for opening the second restriction passage and a closed position for closing the second restriction passage, and a valve chamber having walls, a part of which is formed by a movable wall that is movable along an opening/closing direction of the valve body, said movable wall causing the valve body to be moved into the open position when the valve chamber is supplied with the negative pressure, and into the closed position when the valve chamber is supplied with the atmospheric pressure; an internal passage arranged on the inner peripheral side of the outer cylinder member and communicating the negative pressure chamber and the valve chamber with each other; and an operating pressure supply passage for communicating one of the negative pressure chamber and the valve chamber with an operating pressure supply source for selectively supplying one of the negative pressure and the atmospheric pressure from the outer side of the vibration isolator.

In the vibration isolator according to the first aspect of the present invention, the internal passage on the inner peripheral side of the outer cylinder serves to connect the negative pressure chamber and the valve chamber with each other, and the operating pressure supply passage serves to connect one of the negative pressure chamber and the valve chamber with the operating pressure supply source arranged on the outside of the vibration chamber for selectively supplying one of the negative pressure and the atmospheric pressure. In this way, since the negative pressure chamber and the valve chamber are communicated with each other through the internal passage on the inner peripheral side of the outer cylinder (i.e., within the vibration isolator), the operating pressure supply source is capable of supplying, through the operating pressure supply passage, either the negative pressure or the atmospheric pressure only to one of the negative pressure chamber and the valve chamber in order that the two chambers are supplied with the negative pressure or the atmospheric pressure.

Therefore, with the vibration isolator according to the first aspect of the present invention, the internal passage for communicating the negative pressure chamber and the valve chamber is connected in series with the operating pressure supply passage for communicating one of the negative pressure chamber and the valve chamber with the operating pressure supply source so as to connect both of the negative pressure chamber and the valve chamber with the operating pressure supply source. As a result, in comparison to the conventional vibration isolator wherein two systems of internal passages and air pipelines are provided independently of the other, for connecting the negative pressure chamber and the valve chamber with the operating pressure supply source, the present invention makes it possible to simplify the pipeline structure for connecting the operating pressure supply source to the negative pressure chamber and the valve chamber, and also to reduce the number of components of the pipeline structure. Moreover, since a single system of the operating pressure supply passage serves to connect the operating pressure supply source on the outside of the vibration isolator to both of the negative pressure chamber and the valve chamber, the present invention also makes it possible to simplify the connection work on the outside of the vibration isolator and the sealing work at the connections, thereby facilitating assembly of the pressure isolator to vehicles or the like.

A second aspect of the present invention resides in a vibration isolator according to the first aspect, wherein said internal passage extends through said valve body and said movable wall.

A third aspect of the present invention resides in a vibration isolator according to the first or second aspect, wherein said valve body is formed into an annular shape and arranged on an outer peripheral side of said internal passage so as to be slidingly movable along said opening/closing direction, further comprising an annular sliding seal means for liquid-tightly sealing a clearance between an inner peripheral portion of said valve body and an outer peripheral surface of the internal passage, said seal means being movable in said opening/closing direction along the outer peripheral surface of the internal passage.

A fourth aspect of the present invention resides in a vibration isolator according to any one of the first to third aspects, wherein said movable wall is formed into an annular shape and arranged on the outer peripheral side of said internal passage so as to be slidingly movable along said opening/closing direction, said vibration isolator further comprising an annular, inner peripheral seal means fixedly secured, respectively, to an inner peripheral portion of said movable wall and an outer peripheral surface of said internal passage, for liquid-tightly sealing a clearance between the movable wall and the internal passage, said inner peripheral seal means being elastically deformable in said opening/closing direction.

A fifth aspect of the present invention resides in a vibration isolator according to the fourth aspect, further comprising an annular, outer peripheral seal means fixedly secured, respectively, to an outer peripheral portion of said movable wall and an inner peripheral side of said outer cylinder member, for liquid-tightly sealing a clearance between the movable wall and the outer cylinder member, said outer peripheral seal means being elastically deformable in said opening/closing direction.

A sixth aspect of the present invention resides in a vibration isolator according to any one of the first to fifth aspects, wherein a space is formed between said elastic body on the inner peripheral side of the outer cylinder member and said diaphragm, said vibration isolator further comprising a partition member dividing said space into said main liquid chamber and said auxiliary liquid chamber, said membrane and said negative pressure chamber being arranged in association with said partition member.

A seventh aspect of the present invention resides in a vibration isolator according to any one of the first to sixth aspects, wherein said membrane is comprised of a rubber material and has an outer peripheral portion that is adhered to said partition member by vulcanization, over an entire circumference thereof.

A eighth aspect of the present invention resides in a vibration isolator according to any one of the first to seventh aspects, wherein said valve mechanism comprises a spring member for urging said valve body toward said closed position through said movable wall.

A ninth aspect of the present invention resides in a vibration isolator according to the eighth aspect, wherein said spring member comprises a coil spring that is arranged in said valve chamber in its compressed state.

Effects of the Invention

It will be appreciated from the foregoing description that, with the vibration isolator according to the present invention, it is possible to simplify the pipeline structure for connecting the operating pressure supply source to the negative pressure chamber with the membrane as a partition wall, and also to the valve chamber of the valve mechanism for opening or closing the second restricted passage, and to simplify the connection work for connecting the negative pressure chamber and the valve chamber to the operating pressure supply source.

BRIEF DESCRIPTION OF TEE DRAWINGS

The present invention will be described below with reference to a preferred embodiment shown in the accompanying drawings, wherein.

LIST OF REFERENCE NUMERALS

Figure 1:
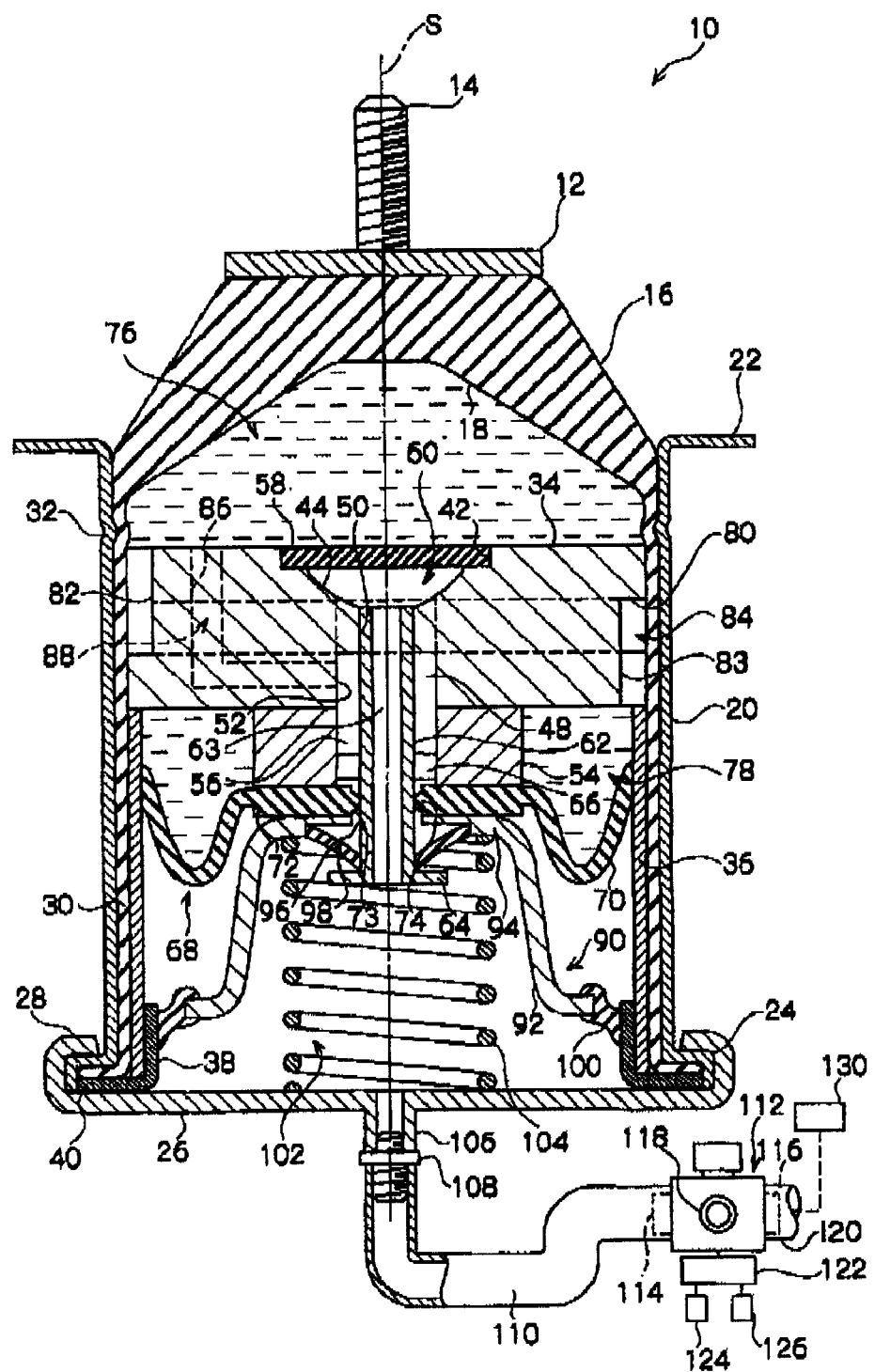
FIG. 1 is a longitudinal-sectional view showing an embodiment of the vibration isolator according to the present invention in a shaking mode.

10 . . . vibration isolator
12 . . . fitting (mounting member)
16 . . . elastic body
20 . . . outer cylinder member
56 . . . insertion hole
58 . . . membrane
58 . . . main liquid chamber
60 . . . negative pressure chamber
62 . . . communication tube (internal passage)
63 . . . internal passage
68 . . . diaphragm
70 . . . diaphragm portion
72 . . . valve body
74 . . . seal projection (sliding seal)
76 . . . main liquid chamber
78 . . . auxiliary liquid chamber
84 . . . shaking orifice (first restriction passage)
88 . . . idling orifice (second restriction passage)
90 . . . valve mechanism
92 . . . movable wall
102 . . . valve chamber
104 . . . coil spring
106 . . . pipeline connection part (operating pressure supply passage)
110 . . . supply/discharge tube (operating pressure supply passage)
112 . . . switching valve (operating pressure supply passage)
130 . . . intake manifold (operating pressure supply passage)

BEST MODE FOR CARRYING OUT THE INVENTION

FIG. 1 shows an embodiment of the vibration isolator according to the present invention. The vibration isolator 10 is applicable to an engine mount for mounting an engine of automobile or the like vehicle, as a vibration source, on a vehicle body as a vibration reception portion. A vertical imaginary line identified by symbol S denotes a center axis of the vibration isolator. The direction along the center axis S is defined as the axial direction of the vibration isolator.

As shown in FIG. 1, the vibration isolator 10 is provided on its top end with a thick disc-like fitting 12 and comprises a thin cylindrical outer cylinder member 20 that is arranged on the lower side of the fitting 12 coaxially thereto. A threaded shaft 14 projects along the center axis S from the center portion of the upper surface of the fitting 12, and is fixedly secured to the fitting 12 by welding or the like. The fitting 12 is fixedly secured to the engine side through the threaded shaft 14. The outer cylinder member 20 has an inner diameter that is larger than the outer diameter of the fitting 12, and is fixedly secured to the vehicle body side through a bracket (not shown).

The vibration isolator 10 further includes an elastic member 16 formed of a rubber material, which is arranged between the fitting 12 and the outer cylinder member 20 as a main vibration isolating body. The elastic body 16 is frusto-conical in shape with its diameter decreasing from the bottom end side toward the top end side in a tapered manner, wherein the top end surface is adhered to the lower end side of the fitting 12 by vulcanization, and the bottom end side has an outer peripheral portion that is adhered to the inner peripheral surface of the outer cylinder member 20 at its top end portion also by vulcanization. In this way, the fitting 12 and the outer cylinder member 20 are resiliently connected to each other by the elastic body 16. The elastic body 16 is provided with a recess 18 at the center portion of its bottom surface. The recess 18 is circular in cross-section along the direction perpendicular to the center axis S, and frusto-conical in cross-section along the axial direction S.

The outer cylinder member 20 is formed on its top end portion with an annular upper flange portion 22 that is bent to extend radially outwards, and also formed on its bottom end portion with an annular lower flange portion 24 that is bent to extend radially outwards. The upper flange portion is brought into abutment with an upper end of a connection bracket (not shown) having an inner peripheral side into which the outer cylinder member 20 is inserted, so as to position the outer cylinder member 20 at a predetermined location along the axial direction. The vibration isolator 10 is further provided with a disc-like bottom plate member 26 for closing the bottom end of the outer cylinder member 20. The bottom plate member 26 is provided, on its outer peripheral portion, with an upwardly bent crimping portion 28 over the entire periphery. The lower flange portion 24 of the outer cylinder member 20 is inserted into the inner peripheral side of the crimping portion until the bottom end of the lower flange portion 24 is brought into abutment with the upper surface of the bottom plate member 26. The upper end portion of the crimping portion is then bent radially inwards so that the lower flange portion 24 is crimped and fixed by the bottom plate member 26, thereby closing the bottom end side of the outer cylinder member 20 by the bottom plate member 26.

The elastic member is integrally provided with a thin cover portion 30 of cylindrical shape, which extends from its lower end portion in the outer peripheral side toward the bottom plate 26. The cover portion 30 is adhered to the inner peripheral surface of the outer cylinder member 20 and the bottom surface of the lower flange portion 24 by vulcanization, so as to cover the inner peripheral surface of the outer cylinder member 20 and the bottom surface of the lower flange portion 24. The outer cylinder member 20 is further formed, in its region close to the upper end, with a reduced diameter portion 32 over the entire periphery, which is recessed radially inwards like a groove. A part of the cover portion 30 projects radially inwards, locally along the reduced diameter portion 32.

The vibration isolator 10 further includes a generally cylindrical, thick partition member 34, and a generally cylindrical, thin support cylinder 36 below the partition member 34, which are both inserted into the inner peripheral side of the outer cylinder member 20. A generally cylindrical connector fitting 38 is inserted into the inner peripheral side of the support cylinder 36 at its lower end portion. The connector fitting 38 has a lower end that is bent to extend radially outwards to form a flange-like clamp portion 40. The clamp portion 40 has an upper surface that is in abutment with the lower end of the support cylinder 26, and an outer peripheral surface that is brought into abutment with the lower flange portion 24. As a result, the clamp portion 40 of the connector fitting 38 is clamped between the lower flange member 24 and the bottom plate member 26 through the cover portion 30 so as to be fixedly secured to the outer cylinder member 20.

The outer peripheral surface of the partition member 34 is urged against the inner peripheral surface of the outer cylinder member 20 through the cover portion 30. The outer peripheral portion at the lower surface of the partition member 34 is in abutment with the support cylinder 36. The outer peripheral surface of the support cylinder 36 is urged against the inner peripheral surface of the outer cylinder member 20 through the cover portion 30. The lower end of the support cylinder 36 is in abutment with the connector fitting 38 that is fixedly secured to the outer cylinder member 20. As a result, the partition member 34 and the support cylinder 36 are both fixedly arranged within the outer cylinder member 20.

Figure 2:
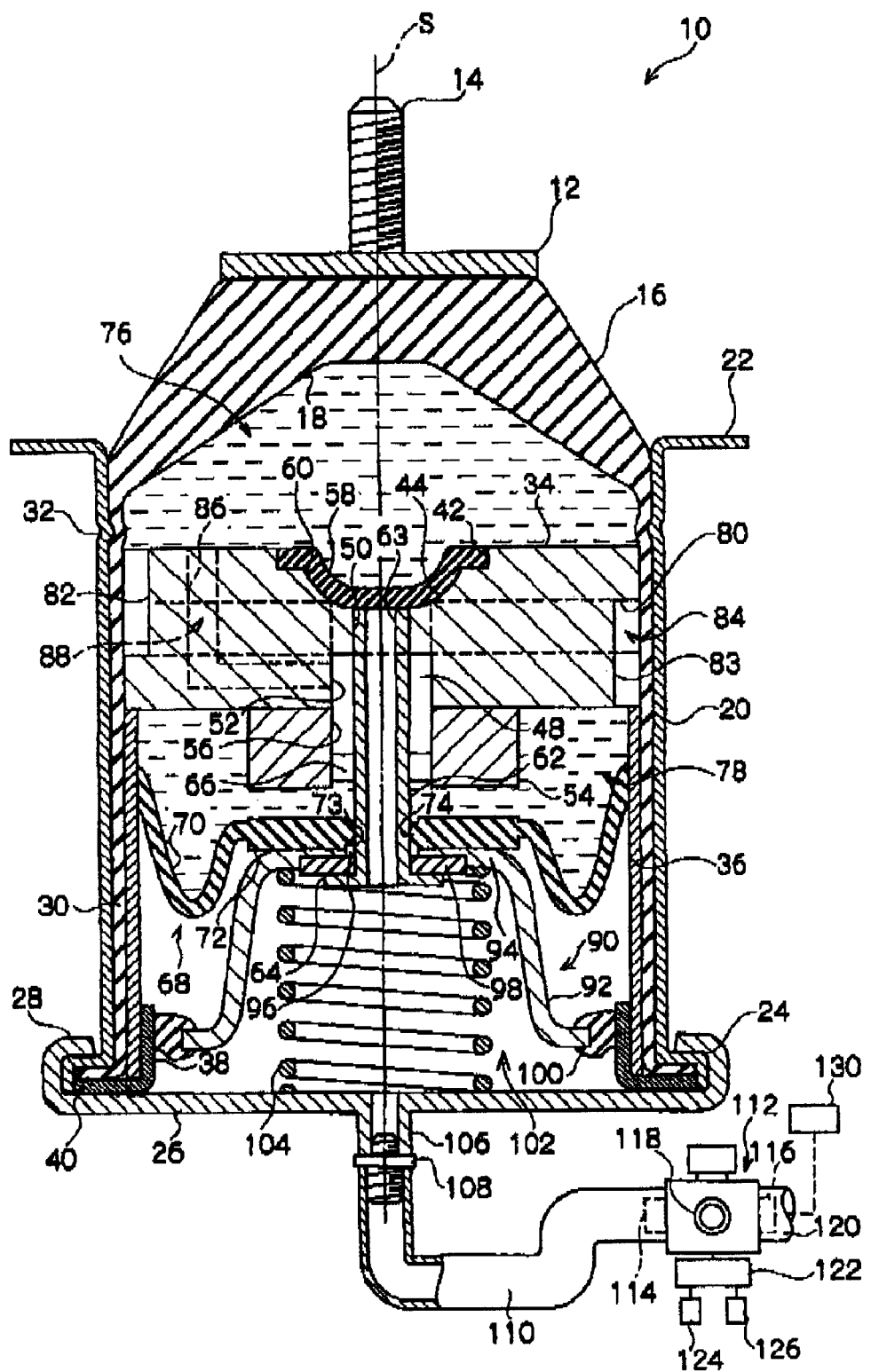
FIG. 2 is a longitudinal-sectional view showing the vibration isolator of FIG. 1 in an idling mode.

As particularly shown in FIG. 2, the partition member 34 is formed with an insertion-fitting portion 42 at the center portion on its upper surface, in the form of a circular recess having a constant inner diameter. A circular recess 44 is formed at the center portion in the lower surface of the insertion-fitting portion 42. The circular recess is defined by a wall surface in the form of a recessed curved surface having a substantially constant radius of curvature. The partition member 34 is formed with a through-hole 48 that extends from the center portion of the recess 44 toward the lower surface side of the partition member 34 along the center axis S. The through-hole 48 is provided, on its upper end side, with a press-fit portion 50 having a circular cross-section, and a large diameter portion 52 having an increased diameter, which is arranged on the lower end side of the press-fit portion 50. Furthermore, an extension member 54 in the form of a thick disc is fixedly secured to the center portion in the lower surface of the partition member 34. The extension portion 54 has an insertion hole 56 extending along the center axis S, which is substantially same in inner diameter as the large diameter portion 52 of the through hole 48. The insertion hole 56 is in communication with the large diameter portion 52 of the through-hole 48.

As particularly shown in FIG. 1, a circular film-like membrane 58 is fitted into the insertion-fitting portion 42 of the partition member 34. The membrane 58 is formed of a vulcanized rubber, and has an outer peripheral surface and an outer peripheral portion in its lower surface, which are adhered, respectively, to the inner peripheral surface and the outer peripheral portion in the bottom surface of the insertion-fitting hole 42 by vulcanization. As a result, the upper end side of the recess 44 is closed by the membrane 58 so as to define a negative pressure chamber 60 within the recess 44, which is defined from outside. The negative pressure chamber 60 is selectively supplied, through a switching valve 112 to be described hereinafter, with either a negative pressure or an atmospheric pressure from outside of the vibration isolator.

The vibration isolator 10 further includes a communication tube 62 that is arranged in the through-hole 48 of the partition member 34 and the through-hole 56 of the extension member 54. The communication tube 62 is circular in cross-section and has an internal passage 63 over the entire length. The lower end portion of the communication tube 62 is provided with a flange-like collar that extends radially outwards. The upper end portion of the communication tube 62 is fixedly press-fitted into the press-fit portion 50, while the lower end portion thereof extends through the large diameter portion 52 of the through-hole 48 and the insertion hole 56, downwards beyond the extension member 54. The extension member 54 is provided with a plurality of stay portions 66 (for example, two or three stay portions), each of which extends from the inner peripheral surface of the insertion hole 56 toward the center axis S, with its tip end fixedly secured by adhesion or the like to the outer peripheral surface of the communication tube 62. By this, the communication tube 62 is coaxially fixed relative to the partition member 34 and the extension member 54.

The vibration isolator 10 further includes an annular diaphragm member 68, which is arranged within the outer cylinder member 20 between the partition member 34 and the bottom plate member 26. The diaphragm member 68 is formed of a vulcanized rubber, and has an outer peripheral surface that is adhered by vulcanization, over the entire periphery, to a region of the inner peripheral surface of the support cylinder 36 close to its upper end. The diaphragm portion 68 includes a thin diaphragm portion 70 on the outer peripheral side, and a valve body portion 72 on the inner peripheral side, which is thicker than the diaphragm portion 70 and formed integrally therewith. The valve body portion 72 is in the form of a flat disc having a center region formed with a circular center opening 73, and is arranged on the outer peripheral side of the communication tube 62. The valve body portion 72 is supported by the outer peripheral surface of the communication tube 62 so as to be movable along the axial direction, through a movable wall 92 to be described hereinafter, axially between an open position in which the valve body portion 72 is in abutment with the collar portion 64 of the communication tube 62, and a closed position in which the valve body portion 72 is in abutment with the lower surface of the extension member 54.

The valve body portion 72 is provided with a seal projection 74 of semi-circular cross-section, which is arranged at an axially intermediate region in the inner peripheral surface of the center opening 73 so as to project radially inwards. The seal projection 74 has an inner peripheral portion that is urged against the outer peripheral surface of the communication tube 62 so as to maintain a state in which it is always compressed along the radial direction. By this, while liquid-tightly sealing the clearance between the inner peripheral surface of the valve body portion 72 and the outer peripheral surface of the communication tube 62, the valve body portion 72 is movable between the open position and the closed position.

In the illustrated embodiment, the diaphragm portion 70 and the valve body portion 72 are integrally molded to form the diaphragm member 68. However, it is possible to mold the diaphragm portion 70 and the valve body portion 72 as separate elements and fixedly secure the inner peripheral portion of the diaphragm portion 70 to the outer peripheral portion of the valve body portion 72 to form the diaphragm member 68. In this instance, the material of the valve body portion 72 is not limited to rubber, and it may be formed of resin, metal material, etc. Also, the seal projection 74 may be molded separately from the valve body portion 72. For example, the inner peripheral surface of the center opening 73 of the valve body portion 72 may be formed with an annular groove in order to accommodate therein an O-ring made of rubber or the like, to form the seal projection that is urged against the outer peripheral surface of the communication tube 62.

In the vibration isolator 10, a liquid chamber space sealed from outside is defined within the outer cylinder member 20 between the elastic body 16 and the diaphragm member 68, which is divided by the partition member 34 into a main liquid chamber 76 with the elastic member 16 forming part of its walls, and an auxiliary liquid chamber 78 with the diaphragm member 68 (diaphragm portion 70) forming part of its walls.

Figure 3:
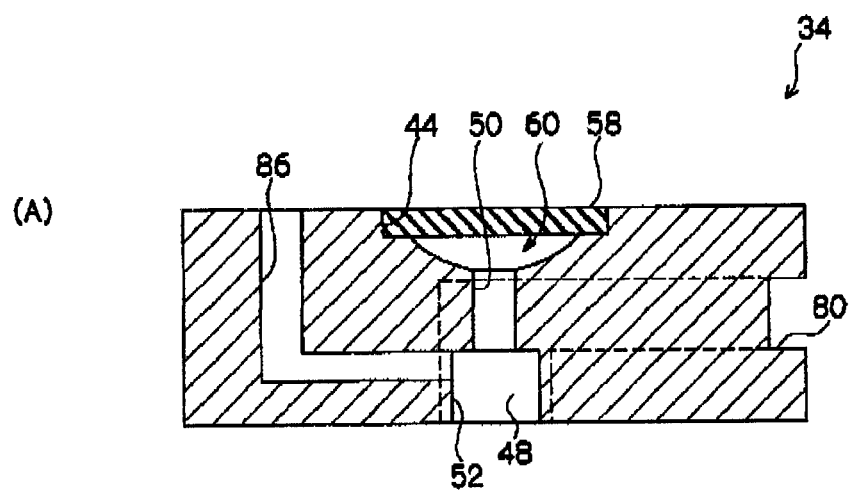
FIGS. 3(A) and 3(B) are, respectively, a longitudinal-sectional view and a perspective view, showing the structure of the partition member in the vibration isolator of FIG. 1.
Figure 3:
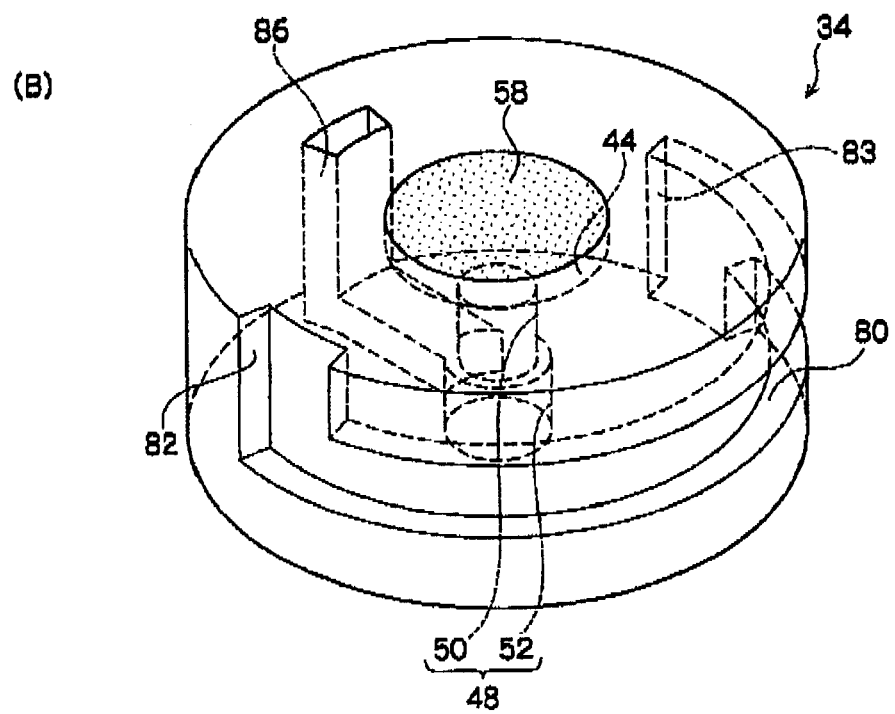

As particularly shown in FIGS. 3(A) and 3(B), the partition member 34 is provided in its outer peripheral surface with a recessed groove portion 80 extending in the circumferential direction, a notch portion 82 extending upwards from one edge of the groove portion 80, and a further notch 83 extending downwards from the other edge of the groove portion 80. The groove portion 80 and the notches 82, 83 are closed on their outer sides by the inner peripheral surface of the outer cylinder member 20 so as to form, as shown in FIG. 1, a shaking orifice 84 as a first restriction passage communicating the main liquid chamber 76 and the auxiliary liquid chamber 78 with each other. The length and the cross-sectional area of this shaking orifice 84 defines the flow resistance of the liquid, which is tuned in accordance with the frequency (e.g., 8 to 12 Hz) and amplitude of the shaking vibration.

The partition member 34 is further formed with an orifice hole 86 that is bent into substantially L-shape, extending between the outer peripheral surface of the large diameter portion 52 and the upper surface portion of the partition member. The orifice hole 86 has a substantially rectangular cross-sectional shape. As shown in FIG. 2, the orifice hole 86 in the partition member 34, the large diameter portion 52 and the insertion hole 56 in the extension member 56 form an idling orifice 88, as a second restriction passage communicating the main liquid chamber 76 and the auxiliary liquid chamber 78 with each other. The idling orifice 88 has a length that is smaller than the length of the shaking orifice 84, and a cross-sectional area that is larger than the cross-sectional area of the shaking orifice 84, so that the flow resistance of the idling orifice 88 is smaller than the flow resistance of the shaking orifice 84. The flow resistance of the liquid, which is defined by the length and the cross-sectional area of the idling orifice 88, is tuned in accordance with the frequency (e.g., 20 to 30 Hz) and amplitude of the idling vibration. Within the vibration isolator 10, the main liquid chamber 76, the auxiliary liquid chamber 78 and the orifices 84, 88 are filled with liquid, such as water, ethylene glycol, and the liquid can flow between the main liquid chamber 76 and the auxiliary liquid chamber 78, through either the shaking orifice 84 or the idling orifice 88.

As shown in FIG. 1, the vibration isolator 10 is further provided with a valve mechanism 90 between the diaphragm member 68 and the bottom plate member 26, which serves to axially drive the valve body portion 72 of the diaphragm member 68. The valve mechanism 90 is provided with a substantially cup-shaped movable wall 92 having an open end on the lower end side. The movable wall 92 is formed with a top plate portion 94 for closing its upper end side, and an insertion opening 96 is formed in the center region of the top plate portion 94. The communication tube 62 is inserted into the insertion opening 96 so that the lower end side of the communication projects downwards, with the collar portion 64 of the communication tube 62 situated in the movable wall 92. Here, the color portion 64 has an outer diameter that is larger than the inner diameter of the insertion opening 96. At the upper surface of the top plate portion 94, the movable wall 92 is fixedly secured by vulcanization or the like, to the lower surface of the valve body portion 72 in the diaphragm member 68, so that these members can be axially moved in integral manner.

The valve mechanism 90 is provided with an annular, inner peripheral seal member 98, which is adhered, by vulcanization, to the inner peripheral end portion of the insertion opening 96 in the movable wall 92, and also to the slightly upper location of the collar portion 64 in the communication tube 62. The inner peripheral seal member 98 is formed of a vulcanized rubber, and configured so that its diametrical intermediate region is flexible along the axial direction. The valve mechanism 90 is further provided with an annular, outer peripheral seal member 100, which is adhered, by vulcanization, to the outer peripheral end portion of the movable wall 92, and also to the inner peripheral surface of the connector fitting 38. Similar to the inner peripheral seal member 98, the outer peripheral seal member 100 is formed of a vulcanized rubber, and configured so that its diametrical intermediate region is flexible along the axial direction. By this, the movable wall can be moved between an open position in which the top plate portion 94 is in abutment with the collar portion 64 through the inner peripheral seal 98, and a closed position in which the top plate portion is in abutment with the lower surface of the extension member 54. Here, the seals 98, 100 have been described as being adhered by vulcanization, though they may be adhered with an adhesive.

The valve mechanism 90 is provided with a valve chamber 102, which is bounded from outside as being surrounded by the movable wall 92 and the bottom plate member 26. The valve chamber 102 has a volume that increases as the movable wall 92 is moved from the open position to the closed position, and decreased as the movable wall 92 is moved from the closed position to the open position. By this, the movable wall 92 is always urged toward the closed position under the restoring force of the coil spring 104. Furthermore, the valve chamber 102 is in communication with the negative pressure chamber 60 of the partition member 34, through the internal passage 63 of the communication tube 62.

The valve mechanism 90 is further provided with a cylindrical connection part 106 that projects downwards from the center region of the bottom plate member 26. A tubular nipple 108 on its one end side is fastened into the connection part 106. Another end side of the nipple 108 is connected to a distal end portion of a supply/discharge tube 110 that is comprised of a pressure-resistant hose or tube. The proximal end portion of the supply/discharge tube 110 it connected to a supply/discharge port 114 of a switching valve 112, so that the valve chamber 102 is communicated to the supply/discharge port 104 of a switching valve 112. Here, the switching valve 112 is comprised of a three-port two-position type electromagnetic valve that is operated by an electromagnetic force, including a first port 116 connected to a connection pipe 120 which, in turn, is connected to an intake manifold 130, i.e., a suction manifold of an engine, and a second port 118 that is open to an atmospheric space.

In an OFF-state of the switching valve 112 in which it is not applied with a driving voltage, the supply/discharge port 114 is communicated with the second port 118 so that the valve chamber 102 is supplied with air under atmospheric pressure, through the switching valve 112 and the supply/discharge tube 110. In this instance, as shown in FIG. 1, the movable wall 92 and the valve body portion 72 in the valve mechanism 90 are maintained in the closed position under the urging force of the coil spring 104 so that the idling orifice 88 is closed by the valve body portion 72. Since the negative pressure chamber 60 is in communication with the valve chamber 102 through the internal passage 63, the internal pressure of the negative pressure chamber 60 is substantially same as the internal pressure (atmospheric pressure) of the valve chamber 102. Thus, the membrane 58 is spaced from the inner wall surface of the negative pressure chamber 60, and is elastically deformable to increase or decrease the volume of the main liquid chamber 76 in response to the change in internal pressure of the main liquid chamber 76.

In an ON-state of the switching valve 112 in which it is applied with a driving voltage, the supply/discharge port 114 is communicated with the first port 116 so that the valve chamber 102 is supplied with negative pressure, through the switching valve 112 and the supply/discharge tube 110. In this instance, as shown in FIG. 2, the movable wall 92 and the valve body portion 72 in the valve mechanism 90 are moved to the open position against the urging force of the coil spring 104 so that the valve body portion is spaced from the idling orifice 88 and the idling orifice is thus opened. The internal pressure of the negative pressure chamber 60 is substantially same as the internal pressure (negative pressure) of the valve chamber 102. Thus, the membrane 58 is elastically deformed to increase the volume of the main liquid chamber 76 and attracted to the inner wall surface of the negative pressure chamber 60, under the action of the negative pressure in the negative pressure chamber 60, and it thus prevented from an elastic deformation to increase or decrease the volume of the main liquid chamber 76 even upon change in internal pressure of the main liquid chamber 76.

The switching valve 112 is connected to a control circuit 122 which is a control means for switching the ON/OFF states of the application voltage based upon judgment of the vehicle driving conditions. The control circuit 122 is driven by the electric power source of the vehicle, and serves to detect the vehicle speed and engine speed by receiving signals at least from a vehicle speed sensor 124 and an engine speed sensor 126 for judging the vehicle driving conditions. By this, based upon the signals from the vehicle speed sensor 124 and the engine speed sensor 126, judgment can be made as to whether the current conditions correspond to a shaking vibration occurring mode or idling vibration occurring mode, i.e., as to whether the vehicle is stopping or running. Based upon the result of this judgment, the control circuit 122 supplies or interrupts the driving voltage to the switching valve 112, so as to effect switching between the atmospheric pressure and the negative pressure.

The function and operation of the vibration isolator 10 as constructed above will be described below. When the engine is operated, to which the fitting 12 is connected, the vibration of the engine is transmitted through the fitting 12 to the elastic body 16. The elastic body 16 serves as a main vibration absorbing body and absorbs the vibration through its vibration absorbing function due to the elastic deformation of the elastic body 16. Furthermore, due to the elastic deformation of the elastic body 16, the volume of the main liquid chamber 76 changes, i.e., decreases or increases, to change the liquid pressure, so that the liquid is moved between the main liquid chamber 76 and the auxiliary liquid chamber 78, through either one of the shaking orifice 84 and the idling orifice 88. In this instance, the change in liquid pressure within the auxiliary liquid chamber 78 is sufficiently small as compared to the change in liquid pressure within the main liquid chamber, since the diaphragm portion 70 deforms with a small resistance due to the flow of the liquid through the orifices 84, 88.

As a result, with the vibration isolator 10 according to the present invention, when the vibration is transmitted from the engine through the fitting 12, the transmitted vibration is absorbed, not only by the deformation of the elastic body 16, but also by the isolating function due primarily to the liquid column resonance through one of the orifices 84, 88 communicating the main liquid chamber 76 and the auxiliary liquid chamber 78 with each other.

The function and operation of the vibration isolator 10 as constructed above will be more fully described below. When, for example, the vehicle is running, shaking vibration occurs. The control circuit 122 judges that the vehicle is under a shaking vibration occurring mode based on the outputs from the vehicle speed sensor 124 and the engine speed sensor 126, so as to communicate the valve chamber 102 to atmospheric space through the switching valve 112.

By this, the air pressure within the valve chamber 102 becomes the atmospheric pressure so that, as shown in FIG. 1, the movable wall 92 of the valve mechanism 90 is pushed up by the urging force of the coil spring 104, the movable wall 92 and the valve body portion 72 are maintained in the closed position in abutment with the lower surface of the extension member 54, and the membrane 58 is spaced from the inner wall surface of the negative pressure chamber 60. In this instance, one of the opening ends of the idling orifice, which is faced with the auxiliary liquid chamber 78, is closed by the valve body portion 72 so that the vibration isolator 10 assumes a shaking mode in which the main liquid chamber 76 and the auxiliary liquid chamber 78 are communicated with each other through the shaking orifice 84 only. Furthermore, since the membrane 58 is spaced form the inner wall surface of the negative pressure chamber 60, the membrane 58 can be elastically deformed in a direction to increase or decrease the volume of the main liquid chamber 76 in response to the change in liquid pressure within the main liquid chamber 76.

As a result, in the vibration isolator 10 according to the present invention, when the input vibration is a shaking vibration, the liquid flowing between the main liquid chamber 76 and the auxiliary liquid chamber 78 through the shaking orifice 84 exhibits a resonance (liquid column resonance), so that the input vibration (shaking vibration) can be highly effectively absorbed by the flow resistance or change in liquid pressure at the shaking orifice 84 due to the liquid column resonance.

When the vehicle is running at a speed higher than the speed generating the peak of the shaking vibration, and the vibration transmitted to the vibration isolator 10 has a frequency higher than that of the idling frequency and an amplitude giving rise to indistinct or covered high frequency noise, the shaking orifice 84 of the vibration isolator 10 tuned to match with the shaking vibration assumes a clogged state, with the result that it becomes difficult for the liquid to flow through the shaking orifice 84, though the membrane 58 undergoes an elastic deformation to increase or decrease the volume of the main liquid chamber 76 synchronously with the input vibration, thereby allowing the suppression of increase in the liquid pressure within the main liquid chamber 76. It is thus possible to suppress increase in the dynamic spring constant of the vibration isolator 10 or the elastic body 16 due to the increase in the liquid pressure within the main liquid chamber 76, to maintain the dynamic spring constant of the elastic body 16 even upon input of a high frequency vibration, such as indistinct or covered high frequency noise, and to effectively absorb the high frequency vibration by the deformation of the elastic body 16.

On the other hand, if the vehicle is stopped, the engine assumes an idling mode thereby causing a vibration with an idling frequency that is higher than that of the shaking vibration. In this instance also, the shaking orifice 84 assumes a clogged state, though the control circuit 122 judges from the outputs of the vehicle speed sensor 124 and the engine speed sensor 126 that the vehicle is in the idling vibration occurrence mode so that the switching valve 112 communicates the valve chamber 102 with the intake manifold 130.

As a result, the valve chamber 102 and the negative pressure chamber 60 are prevailed by the negative pressure so that the negative pressure within the valve chamber 102 moves the movable wall 92 from the closed position to the open position, the valve body portion 72 of the diaphragm member 68 is moved, together with the movable wall 92, from the closed position to the open position, the idling orifice 88 which had been closed by the valve body portion 72 is now opened, and the vibration isolator 10 assumes an idling mode in which the main liquid chamber 76 and the auxiliary liquid chamber 78 are communicated with each other through both of the idling orifice 84 and the shaking orifice 88. Furthermore, the membrane 58 is attracted to the inner wall surface of the negative pressure chamber 60, and the membrane 58 is prevented from elastic deformation for increasing or decreasing the volume of the main liquid chamber 76 even if the internal pressure within the main liquid chamber 76.

Therefore, in the idling mode of the vibration isolator 10, if the input vibration is an idling vibration, the shaking orifice 84 assumes a clogged state and there is essentially no flow of the liquid between the main liquid chamber 76 and the auxiliary liquid chamber 78 through the shaking orifice 84, though the liquid now flows between the main liquid chamber 76 and the auxiliary liquid chamber 78 through the idling orifice 88 having a lower flow resistance of the liquid.

On this occasion, due to the input idling vibration, there occurs a resonance (liquid column resonance) in the liquid flowing between the main liquid chamber 76 and the auxiliary liquid chamber 78 through the idling orifice 88, so that the input vibration (idling vibration) can be highly effectively absorbed by the flow resistance or change in pressure of the liquid at the idling orifice resulting from the liquid column resonance. In this instance, the inner peripheral seal 98 is fully accommodated in the notched recess having a hook-like cross-section in the movable wall 92, of which the outer peripheral surface is adhered by vulcanization, and tightly in contact with the top plate portion 94 of the movable wall and the collar portion 64 of the communication tube. Thus, the adhered portions of the inner peripheral seal 98 in its outer and inner peripheral surfaces are free from any force causing disengagement, to fully achieve the intended sealing function while at the same time exhibiting an excellent adhesion durability.

Furthermore, in the idling mode of the vibration isolator 10, since the membrane 58 is prevented from an elastic deformation in the direction for increasing or decreasing the volume, and the membrane does not undergo an elastic deformation due to the change in liquid pressure within the main liquid chamber 76, it is possible to positively prevent lowering of the driving force (pumping force) for causing a flow of the liquid through the idling orifice 88.

In the vibration isolator 10 according to the embodiment described above, the internal passage 63 of the communication tube 62 on the inner peripheral side of the outer cylinder member serves to connect the negative pressure chamber 60 and the valve chamber 102 with each other, and the pipe connection part 106 and the supply/discharge pipe 110 serve to connect the negative pressure chamber 102 with the supply/discharge port 114 of the switching valve 112 on the outside of the vibration isolator 10 so that the switching valve 112 connects the supply/discharge port 114 either to the intake manifold 130 as the negative pressure source or the atmospheric space. In this way, simply by supplying one of the negative pressure and the atmospheric pressure to the valve chamber 102 from the switching valve 112 and through the supply/discharge pipe 110 and pipe connection part 106, it is possible to supply the negative pressure chamber 60 with the same pressure (either the negative pressure or the atmospheric pressure) as the valve chamber 102.

Therefore, with the vibration isolator 10 according to the embodiment described above, the internal passage 63 of the communication tube 62 for connecting the negative pressure chamber 60 and the valve chamber 102 with each other, on one hand, and the pipe connection part 106 and the supply/discharge pipe 110 for connecting the valve chamber with the switching valve 112, on the other hand, are connected in series with each other so that, in comparison to the conventional vibration isolator wherein two systems of internal passages and air pipelines are provided independently of the other, for connecting the negative pressure chamber 60 and the valve chamber 102 with the operating pressure supply source such as the switching valve, the present invention makes it possible to simplify the pipeline structure for connecting the operating pressure supply source to the negative pressure chamber and the valve chamber, and also to reduce the number of components of the pipeline structure. Moreover, since a single system of the operating pressure supply passage comprised of the pipe connection part 106 and the supply/discharge pipe 110 serves to connect the valve chamber 102 within the vibration isolator with the switching valve 112 on the outside of the switching valve, the switching valve 112 can be connected to the negative pressure chamber 60 through the valve chamber 60 and the communication tube 62, it is possible to facilitate the connection work between the pipelines on the outside of the vibration isolator, and the sealing work at the connections between the pipe connection part 106 and the supply/discharge pipe 110 and between the supply/discharge pipe 110 and the switching valve 112, thereby facilitating assembly of the pressure isolator to vehicles or the like.

In the vibration isolator 10 according to the present invention, since the communication tube 62 (internal passage 63) extends through the movable wall 92, the valve body portion 72, the extension member 54 and the partition member, it is possible to suppress increase in size of the vibration isolator as would be caused if the pipelines for communicating the negative pressure chamber 60 and the valve chamber 102 were arranged on the outside of the outer cylinder member 20.

In the vibration isolator 10 according to the present invention, furthermore, since the coil spring 104 of the valve mechanism 90 urges the valve body portion 72 toward the closed position through the movable wall 92, it is possible to move the valve body portion 72 to either the open position or closed position through the movable wall 92.

In the vibration isolator 10 according to the embodiment described above, the bottom plate member 26 is provided with the pipe connection part 106 in communication with the valve chamber 102. However, such a pipe connection part 106 may be replaced by a tubular pipe connection part provided in the partition member 34 and the outer cylinder member 20 for communicating the negative pressure chamber 60 to outside of the vibration isolator, with the pipe connection part being connected to the distal end of the supply/discharge pipe 110.

The invention claimed is:
1. A vibration isolator, comprising:
an outer cylinder member connected to one of a vibration source and a vibration reception portion;
a mount member arranged on an inner peripheral side of the outer cylinder member and connected to the other of the vibration source and the vibration reception portion;
an elastic body arranged between the outer cylinder member and the mount member;
a main liquid chamber filled with a liquid and having partition walls, a part of which is formed partly by the elastic body so that the main liquid chamber has an inner volume that changes as the elastic body deforms;

an auxiliary liquid chamber filled with a liquid and having partition walls, a part of which is formed partly by a diaphragm so that the auxiliary liquid chamber is expandable/contractible;

a first restriction passage for communicating the main liquid chamber and the auxiliary liquid chamber with each other;

a second restriction passage for communicating the main liquid chamber and the auxiliary liquid chamber with each other, the second restriction passage being different in flow resistance from the first restriction passage;

a film-like membrane forming another part of the partition walls of the main liquid chamber, and being elastically deformable in an expanding/contracting direction for increasing/decreasing the inner volume of the main liquid chamber;

a negative pressure chamber provided on an outer side of the main liquid chamber through the membrane, for attracting the membrane to an inner wall when supplied with a negative pressure, to thereby restrain the membrane from deformation in the expanding/contracting direction, and releasing the membrane from the inner wall when supplied with an atmospheric pressure;

a valve mechanism including a valve body supported movably between an open position for opening the second restriction passage and a closed position for closing the second restriction passage, and a valve chamber having walls, a part of which is formed by a movable wall that is movable along an opening/closing direction of the valve body, said movable wall causing the valve body to be moved into the open position when the valve chamber is supplied with the negative pressure, and into the closed position when the valve chamber is supplied with the atmospheric pressure;

an internal passage arranged on the inner peripheral side of the outer cylinder member and communicating the negative pressure chamber and the valve chamber with each other; and an operating pressure supply passage for communicating one of the negative pressure chamber and the valve chamber with an operating pressure supply source for selectively supplying one of the negative pressure and the atmospheric pressure from the outer side of the vibration isolator, wherein said internal passage extends through said valve body and said movable wall.

2. A vibration isolator according to claim 1, wherein said valve body is formed into an annular shape and arranged on an outer peripheral side of said internal passage so as to be slidingly movable along said opening/closing direction, further comprising an annular sliding seal means for liquid-tightly sealing a clearance between an inner peripheral portion of said valve body and an outer peripheral surface of the internal passage, said seal means being movable in said opening/closing direction along the outer peripheral surface of the internal passage.

3. A vibration isolator according to claim 1, wherein said movable wall is formed into an annular shape and arranged on the outer peripheral side of said internal passage so as to be slidingly movable along said opening/closing direction, said vibration isolator further comprising an annular, inner peripheral seal means fixedly secured, respectively, to an inner peripheral portion of said movable wall and an outer peripheral surface of said internal passage, for liquid-tightly sealing a clearance between the movable wall and the internal passage, said inner peripheral seal means being elastically deformable in said opening/closing direction.

4. A vibration isolator according to claim 3, further comprising an annular, outer peripheral seal means fixedly secured, respectively, to an outer peripheral portion of said movable wall and an inner peripheral side of said outer cylinder member, for liquid-tightly sealing a clearance between the movable wall and the outer cylinder member, said outer peripheral seal means being elastically deformable in said opening/closing direction.

5. A vibration isolator according to claim 1, wherein a space is formed between said elastic body on the inner peripheral side of the outer cylinder member and said diaphragm, said vibration isolator further comprising a partition member dividing said space into said main liquid chamber and said auxiliary liquid chamber, said membrane and said negative pressure chamber being arranged in association with said partition member.

6. A vibration isolator according to claim 1, wherein said membrane is comprised of a rubber material and has an outer peripheral portion that is adhered to said partition member by vulcanization, over an entire circumference thereof.

7. A vibration isolator according to claim 1, wherein said valve mechanism comprises a spring member for urging said valve body toward said closed position through said movable wall.

8. A vibration isolator according to claim 7, wherein said spring member comprises a coil spring that is arranged in said valve chamber in its compressed state.

* * * * *